(12) United States Patent  
Gonciarz et al.

(10) Patent No.: US 9,234,539 B2  
(45) Date of Patent: Jan. 12, 2016

(54) FASTENER

(75) Inventors: Mark E. Gonciarz, South Elgin, IL (US); Donald J. Broomfield, Elgin, IL (US); Jay A. Meisenger, North Aurora, IL (US)

(73) Assignee: Illinois Tool Works Inc., Glenview, IL (US)

( * ) Notice: Subject to any disclaimer, the term of this patent is extended or adjusted under 35 U.S.C. 154(b) by 254 days.

(21) Appl. No.: 13/295,215

(22) Filed: Nov. 14, 2011

(65) Prior Publication Data

US 2012/0294693 A1 Nov. 22, 2012

Related U.S. Application Data

(60) Provisional application No. 61/486,965, filed on May 17, 2011.

(51) Int. Cl.  
*F16B 25/00* (2006.01)

(52) U.S. Cl.  
CPC ......... *F16B 25/0063* (2013.01); *F16B 25/0015* (2013.01); *F16B 25/0052* (2013.01); *F16B 25/0057* (2013.01); *F16B 25/0068* (2013.01); *F16B 25/0084* (2013.01)

(58) Field of Classification Search  
CPC ............. F16B 25/0063; F16B 25/0052; F16B 25/0015; F16B 25/0084; F16B 25/0068; F16B 25/0057; F16B 35/065  
USPC ......... 411/387.1, 387.3, 387.4, 399, 412, 413  
See application file for complete search history.

(56) References Cited

U.S. PATENT DOCUMENTS

| | | | | | |
|---|---|---|---|---|---|
| 586,232 | A | * | 7/1897 | English | 411/399 |
| 3,861,269 | A | * | 1/1975 | Laverty | 411/413 |
| 4,653,244 | A | * | 3/1987 | Farrell | 52/745.21 |
| 5,199,839 | A | * | 4/1993 | DeHaitre | 411/387.3 |
| 5,516,248 | A | * | 5/1996 | DeHaitre | 411/387.2 |
| 5,622,464 | A | * | 4/1997 | Dill et al. | 411/399 |
| 6,106,208 | A | * | 8/2000 | Lin | 411/418 |
| 6,290,444 | B1 | * | 9/2001 | Dicke | 411/399 |
| 6,558,097 | B2 | * | 5/2003 | Mallet et al. | 411/399 |

(Continued)

FOREIGN PATENT DOCUMENTS

DE 42 28 727 A1 3/1994  
EP 1 990 551 A2 11/2008

OTHER PUBLICATIONS

International Search Report and Written Opinion for PCT/US2012/038058, mailed Aug. 1, 2012.

*Primary Examiner* — Flemming Saether  
(74) *Attorney, Agent, or Firm* — Maurice E. Finnegan, III; Beem Patent Law Firm

(57) ABSTRACT

A fastener configured to couple a first substrate to a second substrate may include a head, a shank, and a tip. The shank may have a generally constant diameter between the head and tip, and the shank may include an unthreaded portion proximate the head, a threaded portion proximate the tip, and a reverse threaded portion therebetween. The threaded portion may include a plurality of right handed threads that continue onto the tip, and the reverse threaded portion includes a plurality of left handed threads. The unthreaded portion may have an axial length greater than an axial length of the reverse threaded portion. In addition, the fastener may include one or both of a cut extending radially inward toward the fastener axis proximate the tip and serrations on at least one of the plurality of right handed threads.

19 Claims, 2 Drawing Sheets

(56) References Cited

U.S. PATENT DOCUMENTS

| | | | |
|---|---|---|---|
| 6,616,391 B1* | 9/2003 | Druschel | 411/387.2 |
| 6,666,638 B2* | 12/2003 | Craven | 411/413 |
| 6,698,987 B1* | 3/2004 | Dicke | 411/387.6 |
| 7,037,059 B2* | 5/2006 | Dicke | 411/413 |
| 7,682,119 B2* | 3/2010 | Chen | 411/411 |
| 7,988,396 B2* | 8/2011 | Weiss et al. | 411/386 |
| 2004/0146377 A1* | 7/2004 | Chen | 411/387.4 |
| 2007/0038089 A1* | 2/2007 | Hatano et al. | 600/437 |
| 2007/0059122 A1* | 3/2007 | Lin | 411/412 |
| 2007/0128001 A1 | 6/2007 | Su | |
| 2007/0217887 A1* | 9/2007 | Lin | 411/413 |
| 2007/0237606 A1* | 10/2007 | Takasaki | 411/387.2 |
| 2008/0038089 A1* | 2/2008 | Lin | 411/412 |
| 2009/0010734 A1* | 1/2009 | Lin | 411/413 |
| 2009/0245973 A1* | 10/2009 | Pieciak et al. | 411/413 |
| 2010/0158634 A1* | 6/2010 | Walther | 411/399 |
| 2010/0172718 A1 | 7/2010 | Gong | |
| 2010/0196122 A1* | 8/2010 | Craven | 411/413 |

* cited by examiner

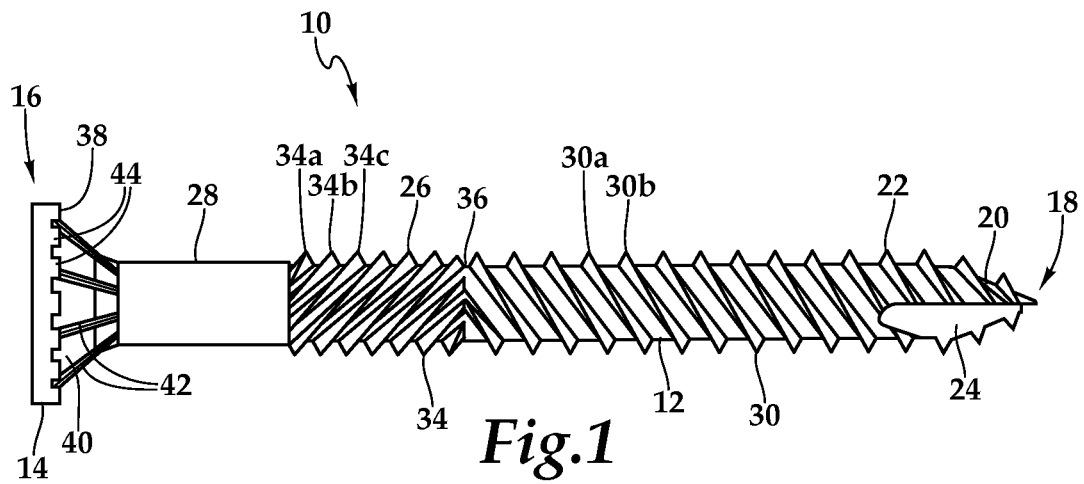
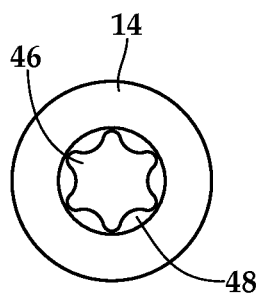
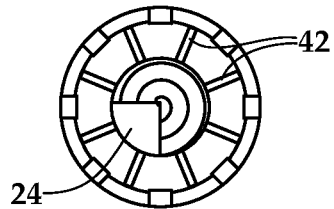
Fig.2　　Fig.3
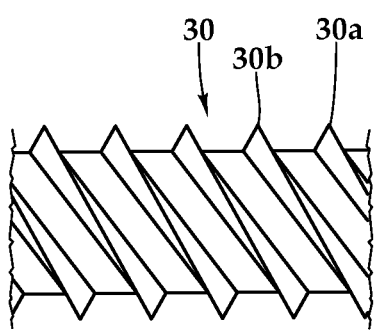
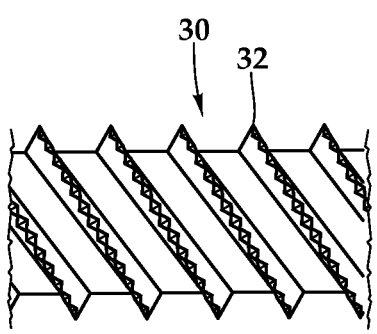
Fig.4　　Fig.4A

FASTENER

This application claims the benefit of U.S. Provisional Application 61/486,965, filed May 17, 2011.

BACKGROUND

Conventional wood fasteners often are used to assemble deck structures. Over time, these fasteners exhibit several problems. As the deck weathers and goes through repeated freezing and thawing cycles, these fasteners may back at least partially out of the wood, leaving metal protrusions sticking up from the deck surface. This problem may be exacerbated by the elastic nature of the materials through which the fasteners are driven, i.e., often wood or similar materials. The fibers of the material that are displaced by driving the fasteners into the substrate attempt to return to their original placement, causing the wood to tend to close on the fasteners. This leads to compression upon the shanks of the fasteners and can cause even further backing out.

The protrusions caused by the backed-out fasteners are unsightly, may make people walking on the deck more prone to tripping, and may cause the deck materials to at least partially separate from each other, which may shorten the life of the deck or require that the user expend additional resources in repairing the deck.

What is needed is a fastener that addresses the problems of the prior art.

SUMMARY

The present disclosure is directed to a fastener for joining a plurality of materials such as wood decking boards together. In an embodiment, the fastener may include a head, a shank, and a tip; the shank comprising an unthreaded section proximate the head, a threaded section proximate the tip, and a reverse threaded section between the unthreaded and threaded sections. The threaded section may include at least one right handed thread, and the reverse threaded section may include at least one left handed thread. The reverse threaded section comprises a plurality of threads, preferably at least three threads. Additionally, the threaded and reverse threaded sections include threads having substantially similar pitches and major diameters.

The fastener may be configured to couple a first substrate to a second substrate, where a combined thickness of the head, the unthreaded section, and the reverse threaded section may be substantially equal to a thickness of the first substrate.

In another embodiment, a fastener configured to couple a first substrate to a second substrate may include a shank extending from a proximal end proximate a head to a distal end proximate a drilling tip, the shank including a threaded portion extending rearward from the distal portion, a reverse threaded portion extending rearward from proximate the threaded portion, and an unthreaded portion extending rearward from proximate the reverse threaded portion. The threaded portion may include threading having a first plurality of threads, and the reverse threaded portion may include threading having a second plurality of threads, where the threaded portion may be substantially longer than the reverse threaded portion. The fastener also may include a cut at the drilling tip, the cut extending inwardly substantially to an axis of said fastener There may be more threads on the reverse threaded portion, i.e., the second plurality may be larger than the first plurality. Additionally, the threaded portion may be at least about 3 times longer than the reverse threaded portion. However, at least one thread in the first plurality and at least one thread in the second plurality may have substantially similar pitches and major diameters.

The fastener also may include an interfacing region between the threaded and reverse threaded portions, where the interfacing region substantially aligns with an intersection between the substrates when the fastener is installed. In addition, the unthreaded portion may have a length smaller than a thickness of the first substrate.

In still another embodiment, a fastener configured to couple a first substrate to a second substrate may include a head, a shank, and a tip. The shank may have a generally constant diameter between the head and tip, and the shank may include an unthreaded portion proximate the head, a threaded portion proximate the tip, and a reverse threaded portion therebetween. The threaded portion may include a plurality of right handed threads that continue onto the tip, and the reverse threaded portion includes a plurality of left handed threads.

The unthreaded portion may have an axial length greater than an axial length of the reverse threaded portion, and the reverse threaded portion may be relatively short, e.g., having an axial length between about 5 mm and about 10 mm. In addition, the fastener may include one or both of a cut extending radially inward toward the fastener axis proximate the tip and serrations on at least one of the plurality of right handed threads.

The threaded portion may include two right handed threads, and the reverse threaded portion may include at least three left handed threads. Each of the plurality of right handed threads may have a pitch and major diameter substantially similar to a pitch and major diameter of each of the plurality of left handed threads.

These and other features and advantages are evident from the following description, with reference to the accompanying drawings.

BRIEF DESCRIPTION OF THE DRAWINGS

FIG. 1 is a side view of one embodiment of a fastener for securing a plurality of substrates together, the fastener having two thread leads in the first threaded section.

FIG. 2 is a top view of the fastener of FIG. 1.

FIG. 3 is a bottom view of the fastener of FIG. 1.

FIG. 4 is a detailed view of a portion of the first threaded section of the fastener of FIG. 1.

FIG. 4A is a detailed view of a portion of the first threaded section of the fastener of FIG. 1, with serrations.

DETAILED DESCRIPTION

Figure 5:
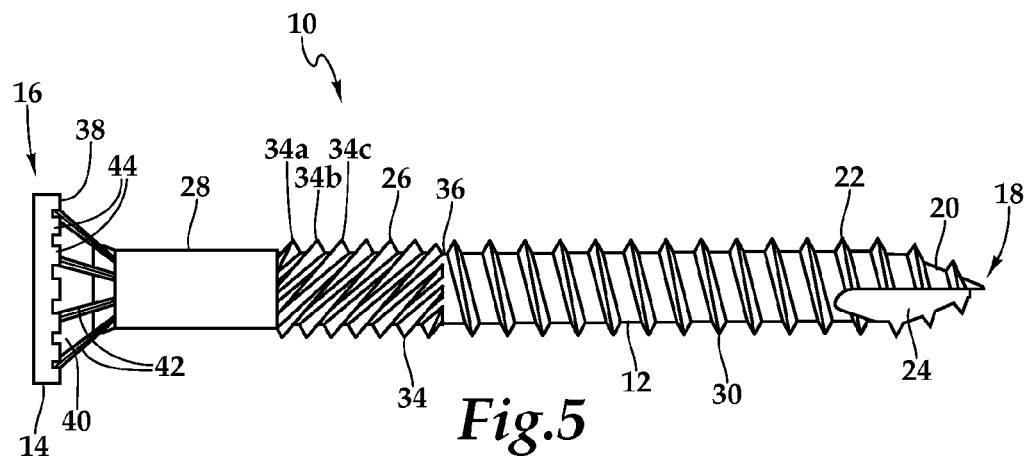
FIG. 5 is a side view of another embodiment of a fastener for securing a plurality of substrates together, the fastener having one thread lead in the first threaded section.

Referring now to FIGS. 1-4, a fastener 10 includes a shank 12 having features designed to secure multiple substrates together while resisting back-out. Fastener 10 extends from head 14 proximate proximal end 16 to drilling tip 20 at distal end 18.

Drilling tip 20 may be generally conical, and may have a sharp included angle at the root of the thread to assist in penetrating the substrate with minimal axial pressure applied by the operator. A wider tip 20 may provide additional material for formation of threading 30, while a narrower tip 20 may allow for insertion using a lower application of axial pressure. Balancing these factors, tip 20 may form a conical angle of between about 10° and about 50°, preferably between about 20° and about 40°, and in one embodiment, about 30°.

Fastener 10 may include a first threading section 22 beginning at said distal end 18 proximate said tip 20 and extending rearward. First threading section 20 may include right hand threading 30 with a lead proximate tip 20. Threading 30 may have at least some predetermined minimum height where it begins, i.e., at point runout, which may allow threading 30 to embed quickly and positively into the substrates. Runout height may be between about 0.1 mm and about 0.5 mm, preferably between about 0.2 mm and about 0.4 mm, and in one embodiment, about 0.25 mm. Threading 30 may expand from this minimum height moving rearward from tip to a point where threading 30 then has a generally constant thread height over a remainder of its length. For example, transition from tapered to generally constant thread height portions of threading 30 may be between about 3 mm and about 8 mm from point runout, preferably between about 4 mm and about 6 mm, and in one embodiment, about 5.4 mm.

Figure 6:
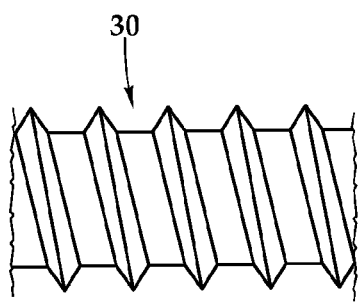
FIG. 6 is a detailed view of a portion of the first threaded section of the fastener of FIG. 5.
Figure 6A:
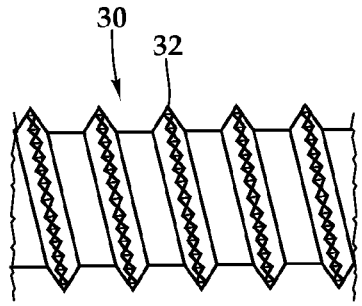
FIG. 6A is a detailed view of a portion of the first threaded section of the fastener of FIG. 5, with serrations.

In the embodiment seen in FIGS. 5-6, threading 30 may be a single lead thread. Alternatively, threading 30 may include multiple leads, such as the double lead threading shown in FIG. 1. Increasing the number of leads may enable faster installation, as the forward axial motion may be about double that of a single lead thread of the same pitch for each rotation of the driving tool. This feature enables a fastener to be installed in half the number of rotations required to drive a single lead thread. Conversely, a larger number of threads may increase the amount of torque required to drive the fastener into the substrates, so more force is required for each rotation. Thus, a choice of the number of leads may balance these concerns, considering also substrate hardness, fastener strength, etc., to ensure that fastener is driven into substrates, is able to drive into substrates of varying hardness values, and is resistant to breaking during driving.

In the case of multiple lead threading, each thread preferably has substantially the same characteristics as the other threads. For example, for the two start, multiple lead threading 30 seen in FIG. 1, first thread 30a may have a pitch, thread height, major diameter, and minor diameter substantially equal to those parameters for second thread 30b.

Sectional profile for each thread in right hand threading 30 may include an included angle between upper and lower faces of threading. Included angle may be between about 20° and about 60°, preferably between about 30° and about 50°, and in one embodiment, about 40°. Determination of included angle may be governed by multiple factors, including shank diameter of blanks from which fasteners are made, e.g., in the case where threads are formed by rolling, and a determination of acceptable tapping torque values as compared to fastener strength. With regard to the latter factor, a smaller included angle may enable reduced tapping torque during installation, but a smaller angle also may require use of a smaller diameter fastener blank, which may limit a maximum torque that can be applied to fastener during installation, e.g., precluding or limiting their use in harder substrates.

Threads 30a, 30b may be formed in any one or more conventional manners known in the art. Preferably threads may be formed by cold rolling a fastener blank to form threads having the desired geometry and dimensions.

First threaded section 22 may include additional features to assist in tapping of threading 30 into substrates. A cut 24 may extend inward substantially to axial center line 8 rearward from tip 20. Cut 24 may have a circumferential extent between about 45 degrees and about 135 degrees, preferably about 90 degrees. Additionally, cut 24 may extend through at least a first full pitch of each thread in first threaded section 22. Preferably, cut 24 extends past conical portion and also past first full diameter portion of each thread in first threaded section 22. Cut 24 may create a face 25 with exposed thread profiles to help assure that the thread profile is tapped into the substrates. In one embodiment, drilling tip 20 with cut 24 may be considered a Type 17 point.

Right hand threading 30 also may include serrations 32 extending around at least a portion of threading. In the embodiment seen in FIGS. 1 and 4, each of the right hand threads 30a, 30b do not show serrations 32 around several revolutions at the major diameter of the threads. FIG. 4A shows an embodiment having serrations 32. Serrations may cut into and across fibers of substrate during thread insertion, which may enhance insertion of fastener 10 and tapping of threading 30.

Fastener 10 may include cut 24, serrations 32, both of these elements, or neither of these elements. For example, the fastener of FIG. 1 and FIG. 7 includes cut 24 and does not include serrations 32, whereas the threading shown in FIG. 4A shows the serrations 32. Although fastener 10 with serrations 32 may be used in a variety of different substrates, serrations 32 may provide increased benefits when fastener 10 is driven into harder substrates, e.g., hardwoods.

Length of first threading section 22 may be chosen depending on the properties of the application for which it is being used. Preferably, substantially all of first threading section 22 is embedded in a second substrate. The thicker the second substrate, or the more holding strength that may be desired, the longer first section 22 may be.

Proceeding rearward from first threading section 22, fastener 10 also may include second threading section 26, which may have a left hand thread 34, i.e., a thread spiraling in a direction opposite from right hand threading 30. Left hand threading 34 may substantially abut right hand threading 30. Because left hand thread 34 spirals in a direction opposite from rotational direction of engagement, left hand thread 34 may not tap threads into substrate but instead may ream out opening and female threads formed by first threading section 22. As such, left hand thread 34 also may be considered a reaming thread or a left hand knurl.

Like right hand threading 30, left hand threading 34 may include one or more leads or threads. As seen in FIG. 1, left hand threading preferably may be about a three start thread, i.e., it may include about three different threads 34a, 34b, and 34c. A larger number of threads may improve reaming, but the number of threads also may be affected by the diameter of the blank from which the fastener is formed, at least in the case where threading 34 is formed by rolling.

Each thread 34a, 34b, 34c in left hand threading 34 may have dimensions substantially similar to dimensions of threads 30a, 30b in right hand threading 30, e.g., substantially similar pitches, thread heights, major diameters, and minor diameters. If a fastener blank having a substantially constant shank diameter is used to form threading 30, 34, the addition of an extra thread in left hand threading 34 may result in a minor variation in major or minor diameter or in thread height, but this variation may be small and still within manufacturing tolerances.

Various length fasteners may be employed depending on the application for which they are being used. As fastener length increases, a length of second threaded section also may increase. Alternatively, the length of second threaded section may remain substantially constant for each fastener, regardless of overall fastener length. Second threaded section length may be between about 2 mm and about 12 mm, preferably between about 4 mm and about 10 mm. In one example, which may correspond to a No. 8 fastener, second threaded section length may be about 5 mm. In another example, which may correspond to a No. 10 fastener, second threaded section length may be about 8.8 mm. In still another example, second threaded section length may be about ¼".

Figure 7:
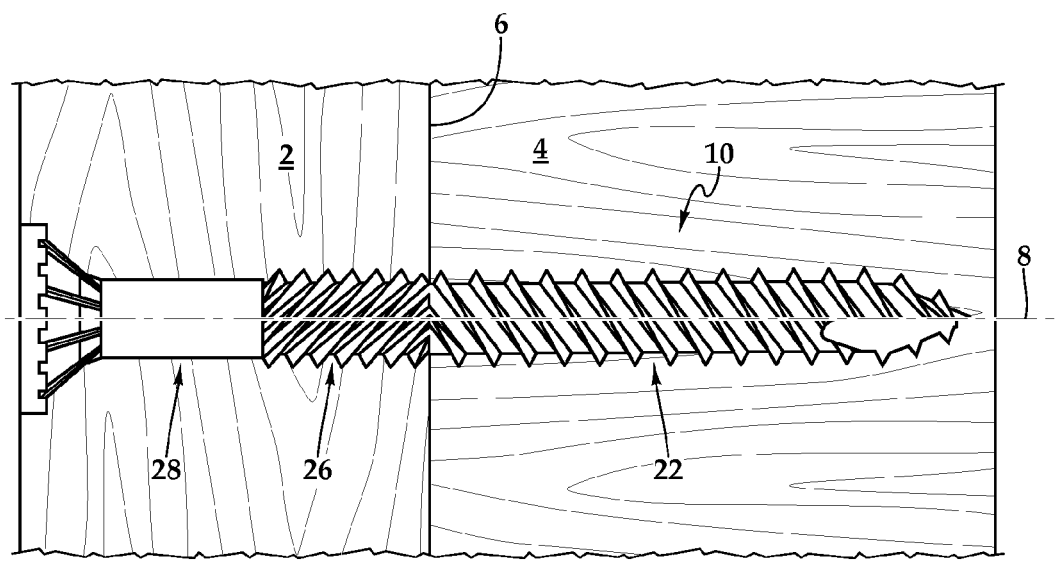
FIG. 7 is a view of the fastener of FIG. 1 installed in a plurality of substrates.

As illustrated in FIG. 7, right hand threading 30 and left hand threading 34 are situated such that interfacing region 36 between them is disposed in the area between substrate elements. Fastener 10 still may operate satisfactorily if a portion of right hand threading 30 is disposed in first substrate or if a portion of left hand threading 34 is disposed in second substrate, although at least a portion of left hand threading 34 preferably is disposed in first substrate.

Interfacing region 36 may include both a proximal end 23 of first threading section 22 and a distal end 27 of second threading section 26. Threading sections preferably may be formed by thread rolling, i.e., first threading section may be formed with a first roll die and second threading section may be formed with a second roll die. Ends of roll dies proximate interfacing region 36, i.e., top of first roll die and bottom of second roll die, may include chamfers that may extend to root diameter of fastener 10. Chamfers may be between about 30 degrees and about 60 degrees, preferably between about 40 degrees and about 50 degrees, and in one embodiment, about 45 degrees. Additionally, both chamfers may be angled substantially the same amount.

Chamfers may strengthen shank 12, which may be beneficial when installing fastener 10 is harder substrates, e.g., in hard woods. Without chamfers, shank 12 at proximal end 23 of first threading section 22 and distal end 27 of second threading section 26 may exhibit a reduction in minor diameter, which may result in stress concentration formations proximate interfacing region. With chamfers, shank 12 may retain a substantially constant minor diameter or, preferably, experience an increase in minor diameter, either via tapering or a slight radius of curvature, thereby thickening shank body while avoiding stress concentrations. At the same time, by allowing for an expanded root diameter, an end of first threading section 22 and a beginning of second threading section 26 proximate interfacing region 36 may be tapered, which may improve entry of threading into substrates.

Although fastener 10 without chamfers may be acceptable, the addition of chamfers may assist in eliminating weakened spots along fastener 10, which may help ensure that fastener 10 does not break during installation.

When fastener 10 is driven into substrates in a conventional manner, i.e. clockwise looking from proximal end 16 to distal end 18, right hand threading 30 rotates to pull fastener through substrates. Conversely, left hand threading 34 contra-rotates. As left hand threading 34 engages substrate, that threading reams out female threads formed by right hand threading 30. Due to one or more of the right hand threading 30 engaging the substrates and the left hand threading 34 reaming out the opening, separation between substrate elements may be reduced. Additionally, if left hand threading extends beyond a bottom or faying surface of the first substrate element, reaming function of threading 34 may assist in removing distortions, splinters, etc., protruding from that surface between the substrate elements, which may enable the two elements to be pulled together and may provide firm contact between them.

Continuing rearward from second threading section 26, fastener 10 may include an unthreaded section 28 between second threading section 26 and head 14. Unthreaded section 28 may have an axial length preferably about at least as long as a length of second threading section 26.

Length of unthreaded section also may be determined based on fastener application, i.e., combined length of fastener head 14, unthreaded section 28 and second threaded section 26 may be approximately equal to thickness of first substrate. Because head 14 may have a substantially constant thickness from fastener to fastener and, as described above, so may second threaded section 26, variations in length to accommodate varying lengths of first substrate may be accomplished by varying length of unthreaded section.

Shank of unthreaded portion may approximately equal to minor diameter of first threaded section 24 and/or second threaded section 26. Preferably, however, fastener 10 may be formed by rolling threads into a fastener blank having a generally constant diameter. As such, thread rolling in first threaded section 24 and/or second threaded section 26 may yield minor diameters slightly smaller than shank diameter of unthreaded portion 28.

Continuing still farther rearward, unthreaded portion 28 may terminate proximate an underside 38 of head 14. Underside of head may include features to help fastener 10 seat fully and securely in substrate. For example, underside 38 may be relatively shallow, having a height between about 2 mm and about 8 mm, preferably between about 4 mm and about 6 mm, and in one embodiment, about 5.1 mm. In another embodiment, underside 38 may be even more shallow, having a thickness of about 3.96 mm. In this embodiment, a remainder of head 14 may be enlarged by about the same thickness that underside 38 is shrunk.

Underside 38 also may have a tapered section 40 between about 30° and about 50° with respect to axis 8, still more preferably between about 35° and about 45°, and in one embodiment, about 40°.

Underside 38 also may include a plurality of ribs 42 running along taper. Fastener 10 may include between about 2 ribs and about 12 ribs, preferably about 8 ribs. Ribs 42 may be substantially circumferentially spaced around head 14 and may seat in first substrate when fastener 10 is driven completely.

Underside 38 further may include a plurality of tabs 44 proximate a widest portion of tapered section 40. Fastener 10 may include a similar number of tabs 44 as ribs 42. Tabs 44 also may substantially circumferentially spaced around head 14, although each tab 44 may be disposed between a respective pair of ribs 42.

Head 14 also may include a recess 46 with a plurality of torque transmitting surfaces 48. Torque transmitting surfaces may form a Phillips-style recess, a 6-lobe recess, any other type recess commonly used in the art, or any other recess that allows the user to apply a driving force and torque to fastener 10 and/or a reversing torque to fastener 10.

When fastener 10 is driven into a plurality of substrates, drilling tip 20 may drill a hole into first substrate 2 and second substrate 4, and first threading section 22 may tap a female thread into the substrates. As drilling tip 20 exits first substrate 2, it may create splinters or other slight blemishes at intersection 6 of substrates.

At some point during insertion, second threading section 26 enters first substrate 2, and left hand threading 34 begins to ream out female threads formed by right hand threading 30. If left hand threading 34

Fastener 10 continues to be driven in this fashion until second threading section 26 reaches intersection 6 of substrates or until head 14 is seated flush or slightly recessed in first substrate 2, as seen in FIG. 7. In the former case, left hand threading 34 may ream off splinters or other blemishes, allowing first and second substrates to seat more flush.

Over time, the fibers of first substrate 2 and/or second substrate 4 may try to return to their original placement, and this process may be exacerbated by weathering, e.g., freezing and thawing. This may result in substrate compressing around fastener 10 generally and around unthreaded section 28 in particular, partially closing up the hole formed during the drilling process. As described above, second threading section 26 may be substantially shorter than a thickness of first substrate 2, which may increase the length of unthreaded section 28 and, therefore, the amount of the hole that may close up.

The weathering effects also may produce an upward force on fastener 10 that may attempt to back out right hand threading 30. This force, however, is countered by left hand threading 34, which will bite into substrate and resist rotation and fastener back-out. Moreover, if fastener is driven such that head 14 is slightly countersunk, surface of first substrate 2 may close up slightly around and over head 14, providing even more material to resist back-out. The net effect may be a substantially self-locking wood screw.

During installation, when left hand threading 34 reams out opening, the fibers that are cut also may into the thread profile between threads 34a, 34b, 34c. Packing may be sufficiently dense such that the combination of threads 34 and cut fibers may form a substantially solid, compacted bar of material in second threading section 26 upon which the surrounding fibers close. In addition to resisting back-out, as described above, this fiber-threading bar may exhibit significantly improved resistance to bending moments applied to the first substrate 2, thereby resisting separation and strengthening attachment between first substrate 2 and second substrate 4 even further.

In the description above, threading in first threading section 22 is referred to as right hand threading, and threading in the second threading section 26 is referred to as left hand threading, as right hand threads conventionally are used to drive fasteners. Equivalently, threads in first threading section may be left hand threads, while threads in second threading section may be right hand threads. Additionally, the fastener has been described as being configured to couple a plurality of substrates together. Typically, these substrates may be wooden elements such as 2×4s, decking material, molding material, etc., but substrates may be other materials with which wood-type screws may be used.

Fasteners 10 may come in a variety of lengths and sizes, which may allow for joining a variety of substrates of various thicknesses to one another. For example, shank diameters such as #8 and #10 may be provided, as may other diameters. Within these sizes, various lengths may be provided, such as approximately 2", 2½", 3", and 3½", although other length fasteners also are possible.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A fastener, comprising:
    a head, a shank, and a tip;
    said shank comprising an unthreaded section proximate said head, a threaded section proximate said tip, and a reverse threaded section between said unthreaded section and said threaded section wherein said reverse threaded section is directly adjacent to said threaded section;
    wherein said threaded section and said reverse threaded section include threads having substantially similar pitches;
    wherein said reverse threaded section includes a greater number of threads per millimeter than said threaded section;
    wherein said shank and said tip include a cut extending inwardly substantially to an axis of said fastener, the cut creating a face with exposed thread profiles;
    wherein said tip is generally conical and forms a conical angle between about 20 degrees and about 40 degrees;
    wherein a runout height for the thread of the threaded section proximate said tip is between about 0.1 mm and about 0.5 mm and a transition from tapered to generally constant thread height is between about 4 mm and about 6 mm; and
    wherein said reverse threaded section has a length between about 4 mm and about 10 mm and said unthreaded section has length at least about as long as said reverse threaded section.

2. A fastener according to claim 1, wherein said threaded section includes at least one right handed thread and said reverse threaded section comprises at least one left handed thread.

3. A fastener according to claim 1, wherein said reverse threaded section comprises a plurality of threads.

4. A fastener according to claim 3, wherein said reverse threaded section comprises at least three threads.

5. A fastener according to claim 1, said fastener configured to couple a first substrate to a second substrate, wherein a combined thickness of said head, said unthreaded section, and said reverse threaded section is substantially equal to a thickness of said first substrate.

6. A fastener according to claim 1, wherein said threaded section and said reverse threaded section include threads having substantially similar major diameters.

7. A fastener configured to couple a first substrate to a second substrate, said fastener comprising:
    a shank extending from a proximal end proximate a head to a distal end proximate a drilling tip, said shank including a threaded portion extending rearward from said distal end, a reverse threaded portion extending rearward from said threaded portion, and an unthreaded portion extending rearward from proximate said reverse threaded portion; and
    a cut at said drilling tip, said cut extending inwardly substantially to an axis of said fastener, the cut creating a face with exposed thread profiles;
    said threaded portion comprising threading having a first plurality of threads;
    said reverse threaded portion comprising threading having a second plurality of threads;
    wherein said second plurality of threads comprises a three start thread;
    wherein said threaded portion is substantially longer than said reverse threaded portion;
    wherein at least one thread in said first plurality and at least one thread in said second plurality have substantially similar pitches;
    wherein said reverse threaded section includes a greater number of threads per millimeter than said threaded section;

wherein said drilling tip is generally conical and forms a conical angle between about 20 degrees and about 40 degrees;

wherein a runout height for a first thread of the plurality of threads of the threaded portion proximate the distal end is between about 0.1 mm and about 0.5 mm and the transition from tapered to generally constant thread height is between about 4 mm and about 6 mm; and wherein said reverse threaded portion has a length between about 4 mm and about 10 mm and said unthreaded portion has length at least about as long as said reverse threaded portion.

8. A fastener according to claim 7, wherein said second plurality includes a greater number of thread starts than said first plurality.

9. A fastener according to claim 8, wherein at least one thread in said first plurality and at least one thread in said second plurality have substantially similar major diameters.

10. A fastener according to claim 7, wherein said shank has a substantially constant diameter from said proximal end to said distal end.

11. A fastener according to claim 7, wherein said threaded portion is at least about 3 times longer than said reverse threaded portion.

12. A fastener according to claim 7, said fastener including an interfacing region between said threaded portion and said reverse threaded portion, wherein said interfacing region substantially aligns with an intersection between said substrates when said fastener is installed.

13. A fastener according to claim 7, wherein said unthreaded portion has a length smaller than a thickness of said first substrate.

14. A fastener configured to couple a first substrate to a second substrate, said fastener comprising a head, a shank, and a tip:

said shank having a generally constant diameter between said head and said tip;

said shank and said tip including a cut having a circumferential extent of between about 45 degrees and about 90 degrees, the cut creating a face with exposed thread profiles;

said shank comprising an unthreaded portion proximate said head, a threaded portion proximate said tip, and a reverse threaded portion therebetween;

wherein said threaded portion includes a plurality of right handed threads;

wherein said right handed threads continue onto said tip;

wherein said reverse threaded portion is directly adjacent to said threaded portion and includes a plurality of left handed threads;

wherein said unthreaded portion has an axial length greater than an axial length of said reverse threaded portion;

wherein each of said plurality of right handed threads has a pitch substantially similar to a pitch of each of said plurality of left handed threads;

wherein said reverse threaded section includes a greater density of threads per millimeter than said threaded section;

wherein said tip is generally conical and forms a conical angle between about 20 degrees and about 40 degrees;

wherein a runout height for the right handed threads proximate said tip is between about 0.1 mm and about 0.5 mm and a transition from tapered to generally constant thread height is between about 4 mm and about 6 mm; and wherein said reverse threaded portion has a length between about 4 mm and about 10 mm and said unthreaded section has length at least about as long as said reverse threaded portion.

15. A fastener according to claim 14, wherein said threaded portion includes two right handed threads.

16. A fastener according to claim 14, wherein said reverse threaded portion includes at least three left handed threads.

17. A fastener according to claim 14, wherein said reverse threaded portion has an axial length between about 5 mm and about 10 mm.

18. A fastener according to claim 14, further including at least one of:

said cut extending radially inward toward an axis of said fastener proximate said tip; and serrations on at least one of said plurality of right handed threads.

19. A fastener according to claim 14, wherein each of said plurality of right handed threads has a major diameter substantially similar to a major diameter of each of said plurality of left handed threads.

* * * * *